(12) United States Patent
Reimanis et al.

(10) Patent No.: US 9,056,794 B2
(45) Date of Patent: Jun. 16, 2015

(54) NEAR ZERO COEFFICIENT OF THERMAL EXPANSION OF BETA-EUCRYPTITE WITHOUT MICROCRACKING

(71) Applicants: Ivar Reimanis, Golden, CO (US); Subramanian Ramalingam, Lakewood, CO (US)

(72) Inventors: Ivar Reimanis, Golden, CO (US); Subramanian Ramalingam, Lakewood, CO (US)

( * ) Notice: Subject to any disclaimer, the term of this patent is extended or adjusted under 35 U.S.C. 154(b) by 77 days.

(21) Appl. No.: 13/866,883

(22) Filed: Apr. 19, 2013

(65) Prior Publication Data

US 2013/0281282 A1    Oct. 24, 2013

Related U.S. Application Data

(60) Provisional application No. 61/636,016, filed on Apr. 20, 2012.

(51) Int. Cl.
| C04B 35/14 | (2006.01) |
| C04B 35/00 | (2006.01) |
| C04B 35/19 | (2006.01) |
| C01B 33/26 | (2006.01) |
| C04B 35/624 | (2006.01) |

(Continued)

(52) U.S. Cl.
CPC ............... *C04B 35/19* (2013.01); *C01B 33/26* (2013.01); *C04B 35/624* (2013.01); *C04B 35/62635* (2013.01); *C04B 35/6264* (2013.01); *C04B 35/62655* (2013.01); *C04B 35/62675* (2013.01); *C04B 35/62685* (2013.01); *C04B 35/645* (2013.01); *C04B 2235/3203* (2013.01); *C04B 2235/3205* (2013.01); *C04B 2235/3217* (2013.01); *C04B 2235/3222* (2013.01); *C04B 2235/3224* (2013.01); *C04B 2235/3284* (2013.01); *C04B 2235/3418* (2013.01); *C04B 2235/441* (2013.01); *C04B 2235/442* (2013.01); *C04B 2235/443* (2013.01); *C04B 2235/446* (2013.01); *C04B 2235/447* (2013.01); *C04B 2235/5436* (2013.01); *C04B 2235/6565* (2013.01); *C04B 2235/6567* (2013.01); *C04B 2235/6581* (2013.01); *C04B 2235/77* (2013.01); *C04B 2235/80* (2013.01); *C04B 2235/81* (2013.01); *C04B 2235/9607* (2013.01); *C01P 2002/72* (2013.01); *C01P 2004/03* (2013.01)

(58) Field of Classification Search
CPC ...... C04B 35/18; C04B 35/185; C04B 35/14; C04B 35/111; C04B 35/115; C04B 2235/3418; C04B 33/13
USPC .................................. 501/128, 133, 153, 154
See application file for complete search history.

(56) References Cited

U.S. PATENT DOCUMENTS

| 5,147,829 A | 9/1992 | Hench et al. |
| 5,196,382 A | 3/1993 | Hench et al. |
| 5,204,077 A * | 4/1993 | Mori et al. ................. 423/328.2 |

(Continued)

OTHER PUBLICATIONS

Nairn, "2.13: Matrix Microcracking in Composites," *Comprehensive Composite Materials, vol. 2: Polymer Matrix Composites*, Elsevier Ltd., 2000, 34 pages.

(Continued)

*Primary Examiner* — Noah Wiese
(74) *Attorney, Agent, or Firm* — Sheridan Ross P.C.

(57) ABSTRACT

The present invention is drawn to a lithia alumina silica material that exhibits a low CTE over a broad temperature range and a method of making the same. The low CTE of the material allows for a decrease in microcracking within the material.

20 Claims, 5 Drawing Sheets

(51) Int. Cl.
*C04B 35/626* (2006.01)
*C04B 35/645* (2006.01)

(56) References Cited

U.S. PATENT DOCUMENTS

| | | | | |
|---|---|---|---|---|
| 5,622,551 | A | * | 4/1997 | Erbe et al. .................. 106/35 |
| 6,001,494 | A | * | 12/1999 | Kuchinski et al. ............ 428/653 |
| 6,066,585 | A | | 5/2000 | Swartz |
| 6,368,668 | B1 | * | 4/2002 | Kobayashi et al. ........ 427/376.2 |
| 6,889,528 | B2 | | 5/2005 | Sen et al. |
| 7,696,116 | B2 | | 4/2010 | Reimanis et al. |
| 2012/0107585 | A1 | | 5/2012 | Blanchard et al. |

OTHER PUBLICATIONS

Pillars et al., "The Crystal Structure of Beta Eucryptite as a Function of Temperature," American Mineralogist, 1973, vol. 58, pp. 681-690.
Ramalingam et al., "Effect of Doping on the Thermal Expansion of β-Eucryptite Prepared by Sol-Gel Methods," Journal of the American Ceramic Society, 2012, vol. 95, Iss. 9, pp. 2939-2943.
Sartbaeva et al., "$Li^+$ ion motion in quartz and β-eucryptite studied by dielectric spectroscopy and atomistic simulations," Journal of Physics: Condensed Matter, 2004, vol. 16, No. 46, pp. 8173-8189.

* cited by examiner

NEAR ZERO COEFFICIENT OF THERMAL EXPANSION OF BETA-EUCRYPTITE WITHOUT MICROCRACKING

CROSS-REFERENCE TO RELATED APPLICATION

This non-provisional patent application claims the benefit of priority from U.S. Provisional Patent Application No. 61/636,016 filed Apr. 20, 2012, the entirety of which is incorporated by reference.

GOVERNMENT INTEREST

This invention was made with Government support under grant number DE-FG02-07ER46397 awarded by the U.S. Department of Energy's Office of Basic Energy Sciences. The Government has certain rights in this invention.

TECHNICAL FIELD

The invention relates to a beta-eucryptite material exhibiting a low coefficient of thermal expansion and the method for making the same.

BACKGROUND OF INVENTION

Lithia alumina silica (LAS) materials may be used for applications in which a very low coefficient of thermal expansion (CTE) is desired. Applications include, but are not limited to, thermal shock-resistant structures, nanolithography platforms, and optical windows. One material sometimes used in such applications is beta-eucryptite. However, a problem that may occur while manufacturing beta-eucryptite is the formation of microcracks that reduce the material's strength. Microcracks may also propagate when the material is exposed to additional post-manufacture mechanical or thermal stress. Microcracks are caused by large differences in the CTE between different crystallographic directions (e.g., the c-axis CTE is about $-17.6 \times 10^{-6}/°$ C. while the a- and b-axis CTE is about $+8.21 \times 10^{-6}/°$ C.). These large differences in axial CTE values are referred to in the art as axial mismatch.

Candidate materials for low/zero CTE applications include, but are not limited to, fused silica and eucryptite/oxide composites. However, fused silica is very expensive to make as large bodies and eucryptite/oxide composites exhibit microcracking.

Because of their low or negative CTE, these silica and eucryptite materials are predominantly used to tailor materials with great resistance to thermal shock and good dimensional stability. Traditionally, such materials have been made by combining the negative CTE materials with those having a positive CTE, in order to produce a composite with a desirable CTE. An alternative method involves changing the composition of the material (e.g. by doping) to produce single phase materials with coefficients of thermal expansion that are close to zero. This type of doping method to produce low CTE materials has not been explored with regard to beta-eucryptite materials.

Sol-gel is a process method for producing high purity ceramics and composites.

The present invention overcomes the above mentioned problems by providing doped low thermal expansion materials, including zinc doped beta-eucryptite materials, and methods for making these materials.

SUMMARY OF INVENTION

The present invention provides a doped low thermal expansion lithia alumina material and a novel sol-gel method that introduces a metal dopant to a lithia alumina silica material to produce doped a low thermal expansion lithia alumina silica material that is less prone to microcracking and thus is better suited for a variety of high thermal stress applications.

An aspect of the present invention relates to a method for making a doped lithia silica alumina material, the material characterized by low coefficients of thermal expansion and decreased microcracking. Microcracking may decrease due to the reduction in the CTE axial mismatch over a broad temperature range. The method of the present invention incorporates a small amount of a dopant (as low as about 0.5 mole %) into the material. The dopant decreases microcracking in the material, which results in a material that is more stable over a broader temperature range. Furthermore, the crystallographic average CTE is altered by this dopant from a value that is large and negative to a value that is relatively very small and positive. Though not wishing to be bound by theory, the CTE alteration is thought to change because the dopant modifies the response of the crystal structure to a temperature change, which may also cause the doped beta-eucryptite to exhibit less microcracking. The lower rate or absence of microcracking in the doped beta-eucryptite results in a material that is a more suitable candidate for a variety of high thermal stress applications.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the terms "lithia alumina silica materials" and "LAS materials" refer to the general class of materials defined as $(Li_2O)_x*(Al_2O_3)_y*(SiO_2)_z$ of which eucryptite materials are one example, and composites thereof. By way of non-limiting examples, LAS materials include spodumene ($LiAlSi_2O_6$) and petalite ($LiAlSi_4O_{10}$).

As used herein, a "eucryptite material" refers to a material comprising $LiAlSiO_4$ or $(Li_2O)*(Al_2O_3)*(SiO_2)_2$, in its various polymorphic forms including alpha, beta and epsilon-eucryptites. In addition, "eucryptite material" refers to composites of these polymorphic eucryptites with other oxides, these composites also referred to as "eucryptite/oxide composites." These other oxides include, but are not limited to, titania and zirconia.

As used herein, "silica" refers to $SiO_2$, "alumina" refers to $Al_2O_3$, and "lithia" refers to $Li_2O$.

As used herein, "coefficient of thermal expansion" or "CTE" refers to the change in length of an object with change in temperature, i.e., fractional change in length per degree of temperature change. In addition, as used herein, a "low CTE" refers to an absolute value of thermal expansion that is less than or equal to about $3 \times 10^{-6}/K$. Conversely, a "high CTE" refers to an absolute value of thermal expansion greater than or equal to about $3 \times 10^{-6}/K$. In addition, a CTE with a "negative" value refers to a material that exhibits an overall contraction with increasing temperature, whereas a CTE with a "positive" value refers to a material that expands with increasing temperature.

As used herein, a "dopant" refers to a material added to another material that alters the physical properties of the other material. Examples of dopants include, but are not limited to, metals and metal oxides precursors used in the sol-gel process may generally include metal nitrates of the desired dopant.

As used herein, an "alkyl orthosilicate" refers to, but is not limited to, tetraethyl orthosilicate, tetramethyl orthosilicate, tetrapropyl orthosilicate, tetrabutyl orthosilicate and mixed alkyl functional group silicates.

As used herein, a "gel" refers to a porous, three-dimensional, continuous solid network surrounding a continuous liquid phase.

DETAILED DESCRIPTION

Figure 1:
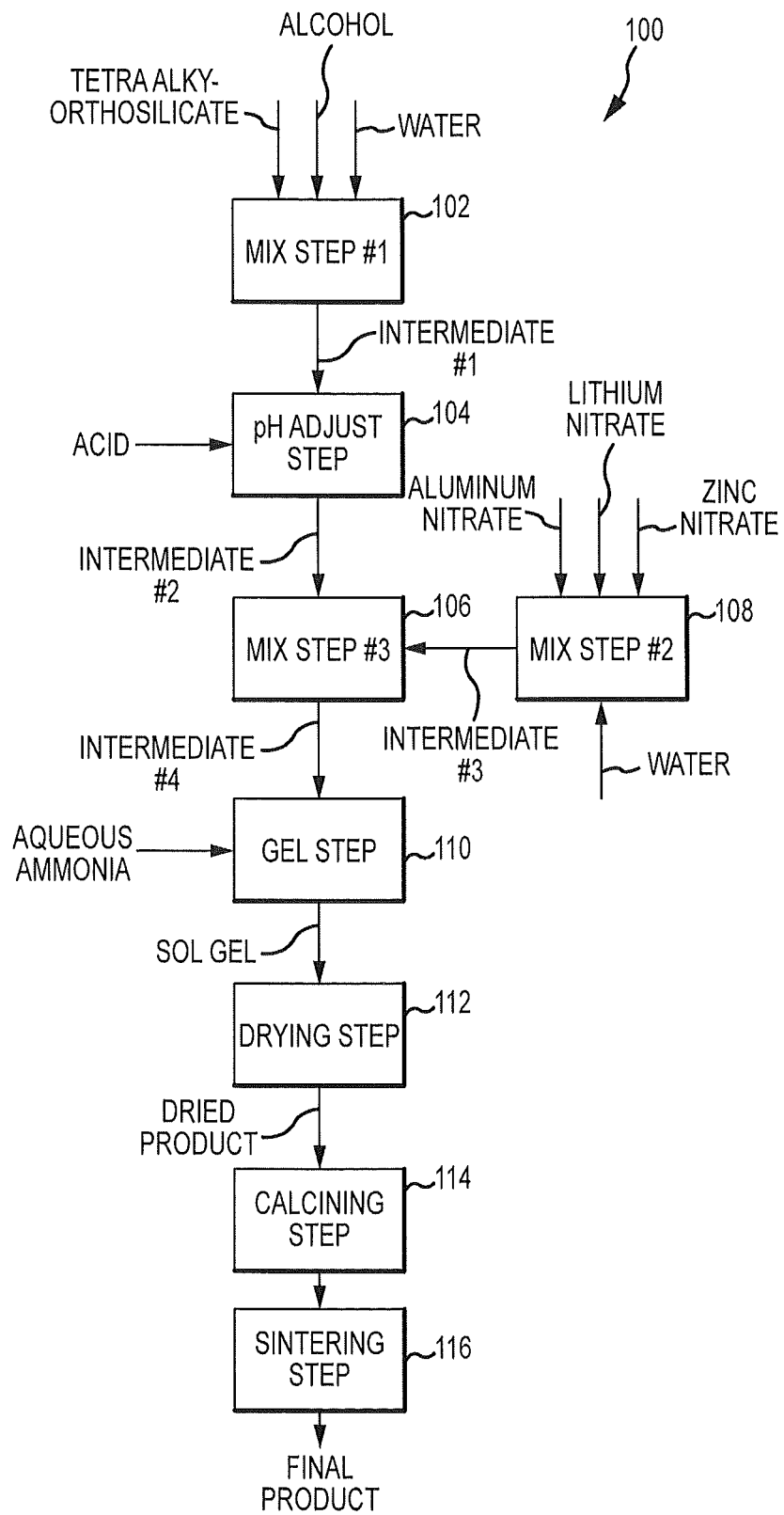
FIG. 1 illustrates an embodiment of the present invention, a process flow diagram for a manufacturing process.

The present invention is drawn to materials that exhibit a low CTE over a broad temperature range and a method of making the same. The present invention modifies a sol-gel method to make pure and doped (about 0.01 mole % to about 10 mole %) materials. In some embodiments, the materials are beta-eucryptite materials.

An aspect of the invention provides a method for producing a doped low thermal expansion lithium aluminosilicate material that includes mixing a source of silicon comprising an orthosilicate with an alcohol and a water to produce a first mixture. The first mixture has a first volumetric ratio of between about 0.5 to about 1.5 parts of the orthosilicate to about between about 0.5 parts to about 1.5 parts of the alcohol, and a second volumetric ratio of about 0.25 to about 0.75 parts of the water to between about 0.5 parts to about 1.5 parts of the orthosilicate. This first mixture is then pH adjusted using an acid, to a pH from about 0.5 to about 4.0, which forms a pH adjusted mixture. A second mixture is prepared by mixing a source of aluminum comprising an aluminum salt, a source of lithium comprising a lithium salt and a metal salt of the desired dopant metal with an equal volume of water. The pH adjusted first mixture is mixed with the second mixture to produce a suspension. The suspension comprises an elemental ratio of about 1 part of aluminum to about 1 part silicon to about 1 part lithium and a metal concentration range of between about 0.01 mole % to about 10 mole % of the metal. Adjusting the molar ratio or the lithia to metal may produce a different composition of doped beta eucryptite. The suspension is then processed to produce the doped low thermal expansion lithia alumina silica material.

It is important to note that the amount of aluminum, silicon and lithium used in some embodiments of the present invention are chosen such that there are approximately equal parts of each. This elemental ratio is important to ensure that there is a stoichiometric balance of the parts to make pure beta eucryptite.

The measured volume of orthosilicate is added to an approximately equal volume of ethanol. The volume of distilled water is about half the volume of orthosilicate. The amounts of alcohol and water controls how fast or slow the reaction may proceed.

In some embodiments of the present invention, the orthosilicate may be an alkyl orthosilicate. In some embodiments of the present invention, the alkyl orthosilicate may be selected from the group consisting of tetramethylorthosilicate, tetraethylorthosilicate, tetrapropylorthosilicate, tetrabutylorthosilicate, tetrapentylorthosilicate and mixtures thereof. In some further embodiments of the present invention, the alkyl orthosilicate may be selected from the group consisting of tetramethylorthosilicate, tetraethylorthosilicate and mixtures thereof.

In some embodiments of the present invention, the alcohol may be selected from the group consisting of a primary alcohol, a secondary alcohol, a tertiary alcohol and mixtures thereof. In some embodiments of the present invention, the alcohol may be selected from the group consisting of methanol, ethanol, n-propanol, i-propanol, n-butanol, i-butanol, pentanol and mixtures thereof. In some further embodiments of the present invention, the alcohol may be selected from the group consisting of methanol, ethanol, and mixtures thereof.

In some embodiments of the present invention, the water may be selected from the group consisting of untreated water, treated water and mixtures thereof. In some embodiments of the present invention, the treated water may be selected from the group consisting of tap water, city water, deionized water, distilled water, softened water and mixtures thereof. In some further embodiments of the present invention, the water may be distilled water.

In some embodiments, the first volumetric ratio may be between about 0.5 parts to about 1.5 parts of the orthosilicate to about 0.5 parts to about 1.5 parts of the alcohol. In some embodiments of the present invention, the first volumetric ratio may be about 0.5 parts orthosilicate, about 0.6 parts orthosilicate, about 0.7 parts orthosilicate, about 0.8 parts orthosilicate, about 0.9 parts orthosilicate, about 1.0 parts orthosilicate, about 1.1 parts orthosilicate, about 1.2 parts orthosilicate, about 1.3 parts orthosilicate, about 1.4 parts orthosilicate or about 1.5 parts orthosilicate to about 0.5 parts alcohol, about 0.6 parts alcohol, about 0.7 parts alcohol, about 0.8 parts alcohol, about 0.9 parts alcohol, about 1.0 parts alcohol, about 1.1 parts alcohol, about 1.2 parts alcohol, about 1.3 parts alcohol, about 1.4 parts alcohol or about 1.5 parts alcohol. In some embodiments of the present invention, the first volumetric ratio may be about 0.90 parts orthosilicate, about 0.92 parts orthosilicate, about 0.94 parts orthosilicate, about 0.96 parts orthosilicate, about 0.98 parts orthosilicate, about 1.00 parts orthosilicate, about 1.02 parts orthosilicate, about 1.04 parts orthosilicate, about 1.06 parts orthosilicate, about 1.08 parts orthosilicate or about 1.10 parts orthosilicate to about 1.0 parts alcohol.

In some embodiments, the second volumetric ratio of orthosilicate to water may be half the ratio of orthosilicate to alcohol. In some embodiments of the present invention, the second volumetric ratio may be about 0.25 parts water, about 0.3 parts water, about 0.4 parts water, about 0.5 parts water, about 0.6 parts water, or about 0.75 parts water to about 0.5 parts orthosilicate, 0.6 parts orthosilicate, 0.7 parts orthosilicate, 0.8 parts orthosilicate, 0.9 parts orthosilicate, 1.0 parts orthosilicate, 1.1 parts orthosilicate, 1.2 parts orthosilicate, 1.3 parts orthosilicate, 1.4 parts orthosilicate, or 1.5 parts orthosilicate.

The second volumetric ratio of the mixing step also corresponds to a molar ratio of water to orthosilicate known in the art as the R-factor. In some embodiments of the present invention, a typical R-factor may be in the range of between about 5 to about 7. In some embodiments of the present invention, the R-factor may be about 7.

In some embodiments of the present invention, the mixing step may be for a time period of between about 5 minutes to about 2.5 hours. In some embodiments, the time period may be about 10 minutes, about 20 minutes, about 30 minutes, about 40 minutes, about 50 minutes, about 60 minutes, about 70 minutes, about 80 minutes, about 90 minutes, about 100 minutes, about 110 minutes or about 120 minutes. In some embodiments, the mixing step may be performed with a magnetic stirrer. In some embodiments, the temperature during the mixing step may be between about 20° C. to about 35° C. In some embodiments, the pressure during the mixing step may be between about 0.8 atm and about 1.2 atm. In some embodiments, the temperature may be ambient and the pressure may also be ambient.

In some embodiments of the present invention, the pH adjusting step may be to a pH of between about 0.5 to about 4.0. In some embodiments, the pH may be about 0.5, about 1.0, about 1.5, about 2.0, about 2.5, about 3.0, about 3.5 or about 4.0.

In some embodiments of the present invention, the acid may be selected from the group consisting of an inorganic acid, an organic acid and mixtures thereof. In some embodiments, the acid may be an inorganic acid selected from the group consisting of nitric acid, hydrochloric acid, phosphoric acid, sulfuric acid, boric acid, hydrofluoric acid, hydrobromic acid, and mixtures thereof. In some embodiments of the present invention, the acid may be nitric acid. Organic acids may include acetic acid, citric acid, picric acid and combinations thereof.

In some embodiments of the present invention, the aluminum salt may comprise a counter-ion selected from the group consisting of sulfates, nitrates, phosphates, carbonates and mixture thereof.

In some embodiments of the present invention, the lithium salt may comprise a counter-ion selected from the group consisting of sulfates, nitrates, phosphates, carbonates and mixtures thereof.

In some embodiments, the metal concentration may be in the range of between about 0.01 mole % to about 10 mole % of the metal. In some embodiments, the metal concentration may be about 0.01 mole %, 0.1 mole %, about 0.2 mole %, about 0.3 mole %, about 0.4 mole %, about 0.5 mole %, about 1.0 mole %, about 2.0 mole %, about 3 mole %, about 4 mole %, about 5 mole %, about 6 mole %, about 7 mole %, about 8 mole %, about 9 mole %, or about 10 mole %. This metal concentration is calculated relative to the total theoretical amounts of lithia present in the suspension.

The orthosilicate, the aluminum salt, the lithium salt and their respective ratios in the suspension, may determine the final low thermal expansion lithia alumina silica material composition. By way of example only, for a final doped low thermal expansion lithia alumina silica material with a target composition of $(Li_2O)*(Al_2O_3)*(SiO_2)_2$, in which two moles of tetraethylorthosilicate $(Si(OC_2H_5)_4)$ may be added during the mixing step, two moles of aluminum nitrate nonahydrate $(Al(NO_3)_3*9H_2O)$ and two moles of lithium nitrate $(LiNO_3)$ may be required to adjust the pH adjusted mixture to yield the desired elemental and oxide ratios, in both the suspension and the final processed doped low thermal expansion lithia alumina silica material.

Another aspect of the present invention, the doped low thermal expansion lithia alumina silica material may be any LAS material, including but not limited to eucryptite, spodumene and petalite. In some embodiments of the present invention, the lithia alumina silica material may be a eucryptite material with a composition of $(Li_2O)(Al_2O_3)(SiO_2)_2$ corresponding to a first molar ratio of about 1.0 parts alumina to about 2.0 parts of silica, and a second molar ratio of about 1.0 parts lithia to about 2.0 parts silica. In other aspects of the present invention, the eucryptite material may be any of the eucryptite's various polymorphic forms, including, but not limited to, alpha-, beta-, and epsilon-eucryptite forms. Another aspect of the present invention relates to a doped lithia alumina silica material that may be a beta-eucryptite. In some embodiments, the first elemental ratio may comprise between about 0.5 to about 1.5 parts of aluminum to between about 0.5 to about 1.5 parts of the silicon to about 0.5 to about 1.5 part of lithium, where the ratio of aluminum, silicon and lithium is not about 1:1:1. In some embodiments of the present invention, metal concentrations of about 1 mol % or higher may result in formation of second phase. By way of example, if zinc is the dopant material, gahnite $(ZnAl_2O_4)$ may be produced. Thus, the overall composition would be beta eucryptite+gahnite.

In some embodiments of the present invention, the metal may be selected from the group consisting of alkali metals, alkaline earth metals, transition metals, post-transition metals, rare earth metals, and mixtures thereof. In some embodiments of the present invention, the metal may be selected from the group consisting of transition metals, post-transition metals and mixtures thereof. In some further embodiments of the present invention, the metal may comprise a transition metal. In some further embodiments of the present invention, the metal may comprise zinc or magnesium.

In some embodiments of the present invention, the metal concentration in the doped low thermal expansion lithia silica alumina material may be about 0.01 mole % of the metal, 0.5 mole % of the metal, about 1.0 mole % of the metal, about 1.5 mole % of the metal, about 2.0 mole % of the metal, about 2.5 mole % of the metal, about 3.0 mole % of the metal or about 4.0 mole % of the metal. In some embodiments of the present invention, the metal counter ion may be selected from the group consisting of nitrate, phosphate, sulfate, carbonate and mixtures thereof. In some embodiments of the present invention, the metal counter ion may comprise nitrate. In some embodiments of the present invention, the metal salt may comprise zinc nitrate.

A further embodiment of the invention provides a method for producing a doped low thermal expansion lithia alumina silica material, wherein the processing step includes adjusting the suspension with a base to obtain a gel, drying the gel to obtain a powder, calcining the powder to produce a calcined powder, grinding the calcined powder to produce a ground powder, and sintering the ground powder to produce the doped low thermal expansion lithia alumina silica material.

In some embodiments of the present invention, the base may comprise aqueous ammonia or ammonium hydroxide.

In some embodiments of the present invention, the drying step of the processing step may include, but is not limited to, direct drying, indirect drying or a combination of both. In some embodiments of the present invention, the drying step may use forced convective gas flow, natural convective gas flow or a combination of both. Equipment used in the drying step may be selected from the group consisting of a rotary drum, a kiln, an oven, a furnace and combination thereof. In some embodiments of the present invention, the drying step may be a drying oven or furnace.

In some embodiments of the present invention, the drying step of the processing step may include maintaining the gel at a drying temperature between about 40° C. to about 100° C. to produce a powder. In some embodiments, the drying temperature may be about 40° C., about 50° C., about 60° C., about 70° C., about 80° C., about 90° C. or about 100° C.

In some embodiments of the present invention, the drying step of the processing step may comprise maintaining the gel at the drying temperature for a time period of between about 8 hours to about 48 hours. In some embodiments, the drying temperature may be maintained at temperature for about 8 hours, about 12 hours, about 16 hours, about 20 hours, about 24 hours, about 28 hours, about 32 hours, about 36 hours, about 40 hours, about 44 hours or about 48 hours to produce the amorphous powder.

In some embodiments of the present invention, the calcination process of the processing step may be a thermal step which occurs in air, where the powder is heated to a high temperature, but not to the melting point or fusing point of the powder. The calcining step may result in further drying of the powder and cause the reduction and/or oxidation and decomposition of carbonates and other oxygen containing compounds contained in the powder.

In some embodiments of the present invention, the calcining step of the processing step may comprise maintaining the powder at a calcining temperature of between about 1000° C. to about 1200° C. In some embodiments, the calcining temperature may be about 1000° C., about 1050° C., about 1100° C., about 1150° C. or about 1200° C.

In some embodiments of the present invention, the calcining step of the processing step may comprise maintaining the powder at the calcining temperature for a period of time of between about 10 hours and about 36 hours. In some embodiments, the calcining temperature may be maintained for about 10 hours, about 12 hours, about 14 hours, about 16 hours, about 18 hours, about 20 hours, about 22 hours, about 24 hours, about 26 hours, about 28 hours, about 30 hours, about 32 hours, about 34 hours or about 36 hours.

In some embodiments of the present invention, the grinding step of the processing step may be characterized by either the process used and/or the particle size distribution of the ground powder generated. Grinding methods may include, but are not limited to, crushing or milling or both. In some embodiments of the present invention, the grinding step may comprise crushing large chunks of solids to a ground powder particle size with a maximum diameter of less than about 0.1 inches. Milling may produce ground powder particle sizes to the low micron or even nano-size range. In some embodiments of the present invention, grinding may comprise milling wherein the equipment used for the milling is selected from the group consisting of roller milling, hammer milling, ball milling, rod milling, jet milling and combinations thereof. In some further embodiments of the present invention, any one or a combination of the above crushing and/or milling methods may be used to produce a ground powder with a final nominal particle size of between about 1.0 µm to about 2 µm. In some embodiments, the final nominal particle size may be about 1.1 µm, about 1.2 µm, about 1.3 µm, about 1.4 µm, about 1.5 µm, about 1.6 µm, about 1.7 µm, about 1.8 µm, about 1.9 µm or about 2 µm in its largest dimension.

In some embodiments of the present invention, the sintering step of the processing step is accomplished by heating the ground powder to elevated temperatures that do not exceed the material's melting point, although viscous and liquid-phase sintering may also be possible Sintering may cause diffusion of solids on the atomic scale and may reduce pore volume on the micro scale to create a monolithic mass of fused particles. The result may be a dense and homogeneous material, the doped low thermal expansion lithia alumina silica material. Sintering may be done under vacuum or at atmospheric pressure. Sintering may be done under an applied mechanical pressure. Sintering may be done under vacuum or in an inert gas atmosphere (argon, nitrogen). In some embodiments of the present invention, the sintering step may include electric current assisted sintering or spark plasma sintering.

In some embodiments of the present invention, sintering may comprise maintaining the ground powder at a sintering temperature of between about 1100° C. to about 1300° C. In some embodiments, the sintering temperature may be about 1100° C., about 1150° C., about 1200° C., about 1250° C. or about 1300° C.

In some embodiments of the present invention, sintering may comprise maintaining the ground powder at the sintering temperature for between about 0.5 hours to about 8 hours. In some embodiments, the sintering temperature may be maintained for about 0.5 hours, about 1.0 hours, about 1.5 hours, about 2.0 hours, about 2.5 hours, about 3.0 hours, about 3.5 hours, about 4.0 hours, about 4.5 hours, about 5.0 hours, about 5.5 hours, about 6.0 hours, about 6.5 hours, about 7.0 hours, about 7.5 hours or about 8.0 hours.

In some embodiments of the present invention, sintering may comprise maintaining the ground powder at the sintering temperature under an applied load of between about 20 MPa to about 40 MPa. In some embodiments, an applied load of about 20 MPa, about 22 MPa, about 24 MPa, about 26 MPa, about 28 MPa, about 30 MPa, about 32 MPa, about 34 MPa, about 36 MPa, about 38 MPa or about 40 MPa may be applied.

In some embodiments of the present invention, the ground powder may be sintered for between about 1.0 hours to about 4.0 hours, at a sintering temperature of between about 1100° C. to about 1300° C. and an applied load of between about 20 MPa to about 40 MPa in a vacuum (about $10^{-6}$ ton) hot press.

An aspect of the present invention provides a method for producing a zinc doped low thermal expansion lithia alumina silica material comprising mixing for a period of time between about 30 minutes to about 60 minutes a silicon source comprising tetraethylorthosilicate with ethanol and distilled water to produce a mixture comprising a first volumetric ratio of about 1.0 parts tetraethylorthosilicate to about 1.0 parts ethanol, and a second volumetric ratio of about 0.5 parts distilled water to about 1.0 parts tetraethylorthosilicate, adjusting the pH of the first mixture to between about 0.5 and about 4.0 by the addition of nitric acid to produce a pH adjusted mixture, preparing a second mixture by adding a source of aluminum comprising aluminum nitrate, adding a source of lithium comprising lithium nitrate, and adding a source of zinc comprising zinc nitrate, to produce a suspension comprising an elemental ratio of about 1 part of aluminum to about 1 part silicon to about 1 part lithium, and a zinc concentration of about 0.01 mole % to about 10 mole % of zinc, forming a gel by adding aqueous ammonia to the suspension, drying the gel at a temperature between about 60° C. to about 100° C. for a first period of time between about 24 hours to about 48 hours to produce amorphous powder, calcining the powder at a temperature between about 1000° C. to about 1200° C. for a second period of time between about 10 hours to about 36 hours to produce a calcined powder, grinding the calcined powder to produce a ground powder comprising a nominal particle size of between about 1 µm to about 2 µm, and sintering the ground powder at a temperature between about 1100° C. and about 1300° C. for a third period of time between about 1 hours to about 8 hours, under an applied load of between about 20 MPa to about 40 MPa, in a vacuum hot press to produce the doped low thermal expansion lithia alumina silica material.

An aspect of the present invention provides a method for producing a zinc doped low thermal expansion lithia alumina silica material comprising mixing for a period of time between about 30 minutes to about 60 minutes a silica source comprising tetramethylorthosilicate with methanol and distilled water to produce a mixture comprising a first volumetric ratio of about 1.0 parts tetramethylorthosilicate to about 1.0 parts methanol, and a second volumetric ratio of about 0.5 parts distilled water to about 1.0 parts tetramethylorthosilicate, adjusting the pH of the first mixture to between about 0.5 and about 4.0 by the addition of nitric acid to produce a pH adjusted mixture, modifying the pH adjusted mixture by adding a source of alumina comprising aluminum nitrate, adding a source of lithia comprising lithium nitrate, and adding a source of zinc comprising zinc nitrate, to produce a suspension comprising an elemental ratio of about 1 part of aluminum to about 1 part silicon to about 1 part lithium, and a zinc concentration of about 0.01 mole % to about 10 mole % of zinc, forming a gel by adding aqueous ammonia to the suspension, drying the gel at a temperature between about 60° C. to about 100° C. for a first period of time between about 24 hours to about 48 hours to produce a powder, calcining the powder at a temperature between about 900° C. to about 1200° C. for a second period of time between about 10 hours to about 36 hours to produce a calcined powder, grinding the calcined powder to produce a ground powder comprising a nominal particle size of between about 1 μm to about 2 μm, and sintering the ground powder at a temperature between about 1100° C. and about 1300° C. for a third period of time between about 1 hours to about 4 hours, under an applied load of between about 20 MPa to about 40 MPa, in a vacuum hot press to produce the doped low thermal expansion lithia alumina silica material.

An aspect of the present invention is a doped low thermal expansion lithia alumina silica material comprising a first elemental ratio of about 1 part of aluminum to about 1 part silicon to about 1 part lithium, and a metal dopant concentration between about 0.01 mole % to about 10 mol %, wherein the metal dopant concentration is calculated relative to the total amount of the lithium present in the material.

In some embodiments, the metal dopant concentration may be about 0.01 mole %, 0.5 mole %, about 1.0 mole %, about 2.0 mole %, about 3.0 mole %, about 4.0 mole %, about 5.0 mole %, about 6.0 mole %, about 7.0 mole %, about 8.0 mole %, about 9.0 mole % or about 10 mol %, wherein the metal dopant concentration is calculated relative to the total amount of the lithium present in the material.

In some embodiments of the present invention, the metal dopant may be selected from the group consisting of an alkali metal, an alkaline earth metal, a transition metal, a post-transition metal, a rare earth metal and combinations thereof. In some further embodiments of the present invention, the metal dopant may be selected from the group consisting of a transition metal, a post-transition metal, and combinations thereof. In some further embodiments of the present invention, the metal dopant may be zinc.

In some embodiments of the present invention, the low thermal expansion lithia alumina silica material may further comprise another oxide wherein the oxide is a metal oxide wherein the metal of the metal oxide is selected from the group consisting of antimony, arsenic, barium, bismuth, calcium, chromium, cobalt, copper, iron, lead, magnesium, manganese, nickel, rubidium, silver, thallium, and tin.

In some embodiments of the present invention, the low thermal expansion lithia alumina silica material may comprise eucryptite. In some further embodiments of the present invention, the low thermal expansion lithia alumina silica material may comprise beta-eucryptite.

In some embodiments of the present invention, the low thermal expansion lithia alumina silica material may comprise spodumene. In some embodiments of the present invention, the low thermal expansion lithia alumina silica material may comprise petalite.

FIG. 1 illustrates a method for forming a doped low thermal expansion lithia alumina silica material 100. Alcohol, water and tetra alkyl-orthosilicate are mixed in mixing step 1 102 to form an intermediate. The pH of the intermediate is adjusted using acid in pH adjust step 104 to form an adjusted pH intermediate. A third intermediate is formed by mixing aluminum nitrate, lithium nitrate, zinc nitrate and water in mixing step 108. The third intermediate and the adjusted pH intermediate are mixed together in mixing step 106 to form a forth intermediate. The forth intermediate is combined with aqueous ammonia to form a sol gel in gel step 110. The sol gel is dried in drying step 112 to form a dried product is calcined in step 114, then sintered in step 116 to form a final product.

EXAMPLES

Example 1

In the present invention, a measured volume of tetraethylorthosilicate (TEOS available from Sigma Aldrich, St. Louis, Mo. 63103 USA) was first added to an equal volume of ethanol (about 95%) and half the original volume of distilled water, to achieve an R-factor (water moles/TEOS moles) of between about 5 to about 7. In some embodiments, the R-factor was about 7. Other suitable solvents include methanol, tetramethyl orthosilicate (TMOS). A person skilled in the art would understand that the moles of water in a suitable solvent would be taken into account to achieve an appropriate R-factor. A few drops of a suitable acid, such as 1M $HNO_3$ were added to adjust the pH of the solution to between about 0.5-4. Though any suitable acid may be used, nitric acid is preferred because the present invention utilizes a nitrate precursor. The addition of the acid also helps to obtain a clear solution after a few minutes of stirring the solution at room temperature. Furthermore, the more acidic the acid is, the less time is required for stirring to obtain a clear solution. An aqueous nitrate solution was prepared by mixing appropriate stoichiometric amounts of aluminum nitrate ($Al(NO_3)_2 \cdot 9H_2O$ available from Sigma Aldrich, St. Louis, Mo. 63103 USA), lithium nitrate ($LiNO_3$ available from Sigma Aldrich, St. Louis, Mo. 63103 USA) and zinc nitrate ($Zn(NO_3)_2 \cdot 6H2O$ available from Sigma Aldrich, St. Louis, Mo. 63103 USA). In a typical sample, about 25 g of powder (after calcination) may be obtained by mixing. The aqueous nitrate solution was added to the stoichiometric quantity of the TEOS solution. A homogeneous solution was then obtained after between about 30 to about 60 minutes of mixing, in some embodiments about 30 minutes of mixing. Any suitable stirrer may be used, including but not limited to a magnetic stirrer. This solution was then treated with excess aqueous ammonia (about 10-15 weight %) to obtain a gel. The gel was dried for between about 60° C. to about 100° C., preferably at about 70° C. for between about 24 hours to about 48 hours to obtain amorphous powders. These powders were then calcined in air at between about 900° C. to about 1200° C., in some embodiments about 1100° C., for between about 10 hours to about 36 hours, in some embodiment about 15 hours. The resulting powders were analyzed using X-ray diffraction (XRD) to confirm the presence of single phase beta-eucryptite.

The resulting powders were then ground in a ball mill in any suitable alcohol medium, such as ethanol, to achieve a final nominal particle size of about between about 1 μm to about 2 μm, in some embodiments about 1 μm. The powders were then poured into a 25 mm in diameter graphite die, and sintered in a vacuum hot press (approximately 1×10⁻⁶ torr to about 7×10⁻⁵ ton) at between about 1100° C. to about 1300° C., in some embodiments about 1200° C. for between about 1 hour to about 4 hours, in some embodiments about 2 hours under an applied load of between about 20 MPa to about 40 MPa, in some embodiments about 30 MPa The substrate was cooled at a ramp rate of approximately 1° C./min to about 2° C./min, in some embodiments about 1° C./min. The density of all the samples was measured using Archimedes technique and was found to be between about 97% to about 99%, in some embodiments about 97-98% (theoretical density of about 2.34 g/cm³).

The calcined powders as well as the sintered pellets were characterized using XRD to determine the purity of the material and confirm the presence of single phase beta-eucryptite. XRD was carried out using a Philips X'Pert Pro MPD Diffractometer (PANalytical, Almero, Netherlands) with a copper source ($\lambda$ about 1.54 A°) and a nickel filter. An X'Celerator detector was used for all the analysis, though it is understood that any suitable detector may be used. The sintered pellet was also characterized using the SEM to determine the microstructure and grain size of the material. A JEOL JSM-7000F field emission scanning electron microscope (FESEM) with EDAX Genesis energy dispersive X-ray spectrometer was used to characterize the microstructures. The specimens were prepared for microscopy by mechanical polishing with silicon carbide papers (Nos. 120, 240, 320, 400, 600 and 800), followed by fine polishing on nylon cloth with 6 μm, 3 μm, 1 μm and 0.25 μm diamond paste. Etching was performed with different concentrations of hydrofluoric acid for periods of 5-12 seconds.

The thermal expansion measurements were performed on pure beta-eucryptite and Zn-doped beta-eucryptite specimens of dimensions 4 mm×4 mm×15-20 mm. A Netzsch DIL 402C vacuum tight horizontal pushrod dilatometer fitted with a Netzsch TA SC 414/3 temperature controller (Netzsch Instruments, MA 01803 USA) was utilized to measure the thermal expansion of all the samples. The measurements were performed at a heating and cooling rate of about 2° C./min between about room temperature and about 1000° C. The expansion behavior of the ceramic specimens was monitored during the heating and cooling cycles, according to ASTM C1470-06. An alumina sample holder and pushrod were used with cubic zirconia (based on about 10 mole % yttria stabilized zirconia) spacers to prevent reaction between beta-eucryptite and alumina. A constant force of about 0.3 N was applied to the specimen cross-section during the measurements. A fused silica specimen was used as a reference standard to perform a calibration prior to performing the tests on all the samples. The thermal expansion coefficient was calculated from the measurements in the temperature range of about 25° C. to about 1000° C.

Figure 2:
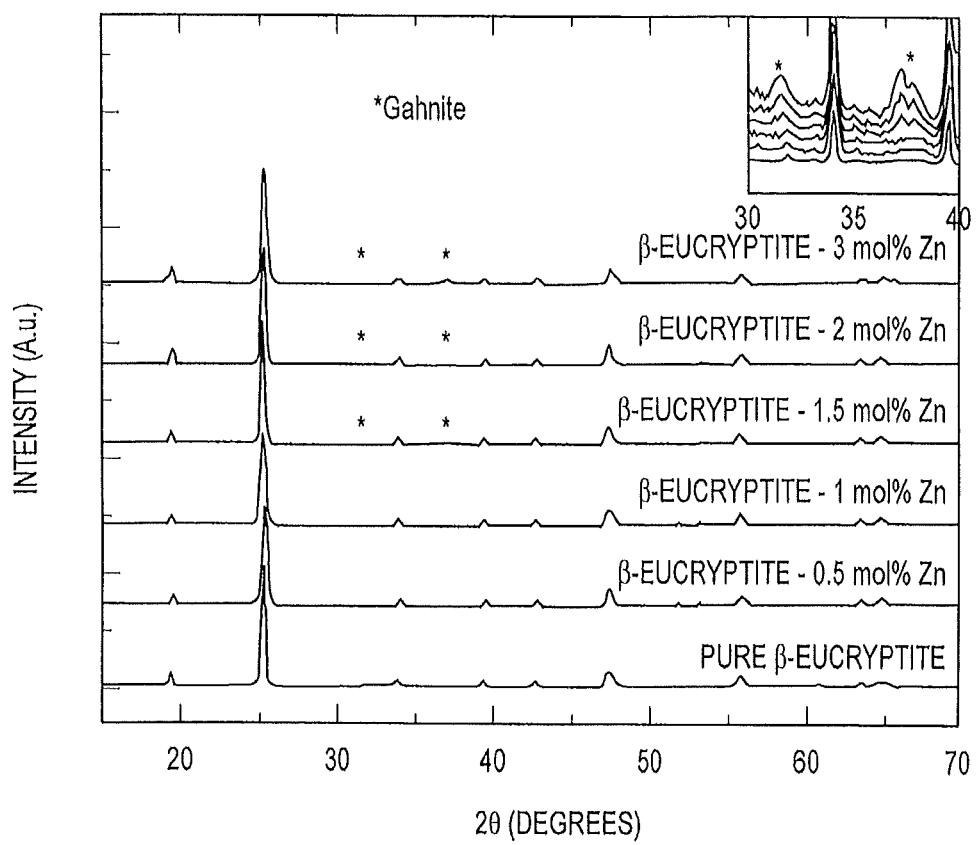
FIG. 2 illustrates the XRD patterns of pure and Zn-doped beta-eucryptite.

FIG. 2 illustrates the XRD patterns of the resultant pure and Zn-doped beta-eucryptite at varying mole percents. The X-ray diffraction patterns of pure and Zn doped beta-eucryptite confirm the presence of beta-eucryptite. Very small peaks (indicated by the * on FIG. 2) correspond to gahnite ($ZnAl_2O_4$) are observed in specimens containing more than about 1 mole % Zn. The inset graph is a magnified view showing the presence of gahnite peaks in specimens with more than 1 mole % Zn. FIG. 2 illustrates that the Zn doped specimens are mostly or completely pure beta-eucryptite. No shift in any of the main peak positions was observed in any of the specimens.

Figure 3:
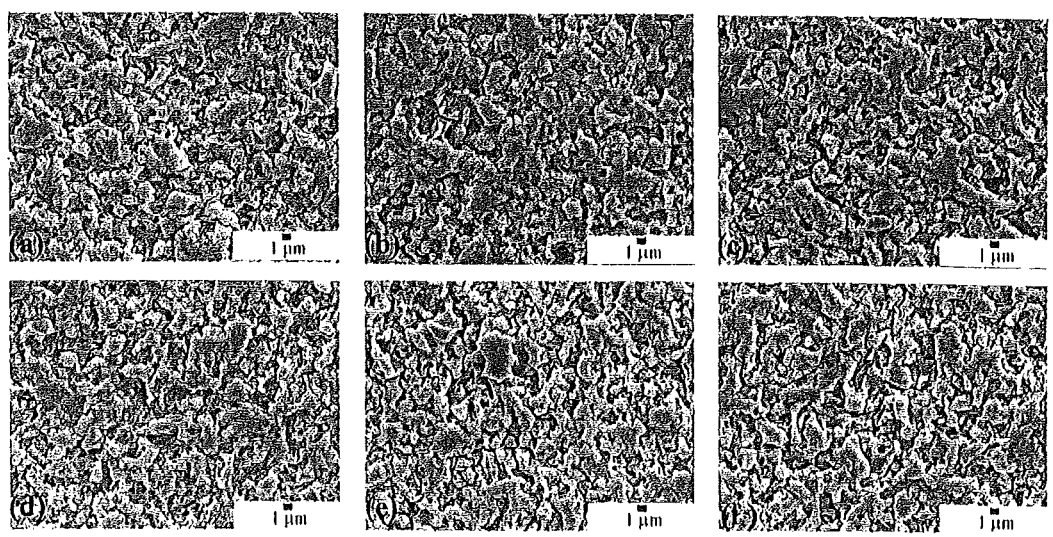
FIG. 3 illustrates SEM showing microstructures of pure and Zn doped beta-eucryptite after chemical etching.

FIG. 3 illustrates SEM showing microstructures of the resultant pure and Zn doped beta-eucryptite after chemical etching with hydrofluoric acid. FIG. 3a illustrates pure beta-eucryptite. FIG. 3b illustrates beta-eucryptite-0.5 mole % Zn. FIG. 3c illustrates beta-eucryptite-1 mole % Zn. FIG. 3d illustrates beta-eucryptite-1.5 mole % Zn. FIG. 3e illustrates beta-eucryptite-2 mole % Zn and FIG. 3f illustrates beta-eucryptite-3 mole % Zn. An optimum etch was determined to be achieved with about 0.008% HF to about 0.05% HF for between about 5-7 seconds for pure beta-eucryptite and Zn-doped beta-eucryptite respectively. It is clear there is no difference in grain size between the pure and Zn-doped beta-eucryptite. The nominal grain diameter for all the samples was about 2 μm. No microcracks were observed in any of the microstructures.

Figure 4:
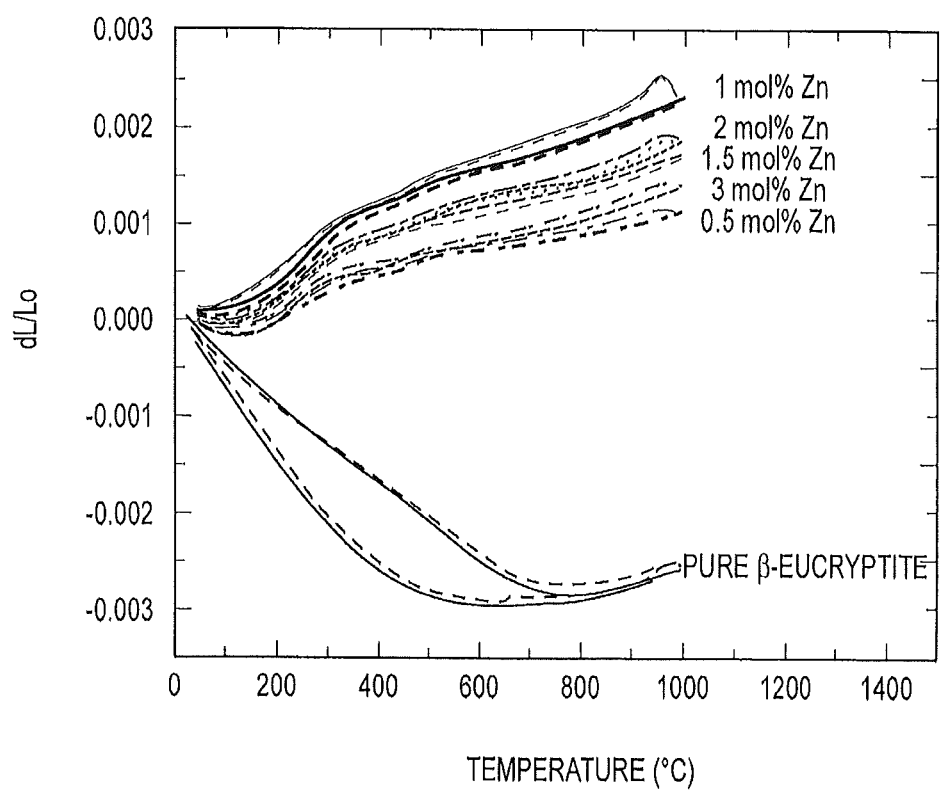
FIG. 4 illustrates the thermal expansion behavior of pure and Zn doped beta-eucryptite between about room temperature and about 1000° C.

FIG. 4 illustrates the thermal expansion behavior of the resultant pure and Zn doped beta-eucryptite between about room temperature and about 1000° C. Doping with Zn results in a markedly different thermal expansion behavior compared to pure beta-eucryptite. Two successive cycles from about room temperature to about 1000° C. were measured for each specimen. The experiment was repeated at the end of the first cooling cycle, and the thermal expansion behavior of the different specimens in the repeat cycles is shown by dotted lines in FIG. 4. Not only has the direction of the slope of the curve changed when the samples are doped with Zn, but the slope is also greatly reduced in the samples doped with Zn.

The linear thermal expansion for each sample from Example 1 were calculated using equation (1) where $L_o$ is the specimen length at room temperature, and L is the length at the tested temperature.

$$\frac{\Delta L}{L_o} = \frac{L - L_o}{L_o} \qquad (1)$$

The corresponding coefficient of thermal expansion, $\alpha$, was calculated as well (equation (2)) where $\Delta T = T - T_o$, $T_o$ is the room temperature, and T is the temperature of testing.

$$\alpha(T) = \frac{1}{L_o} \frac{\Delta L}{\Delta T} \qquad (2)$$

Figure 5:
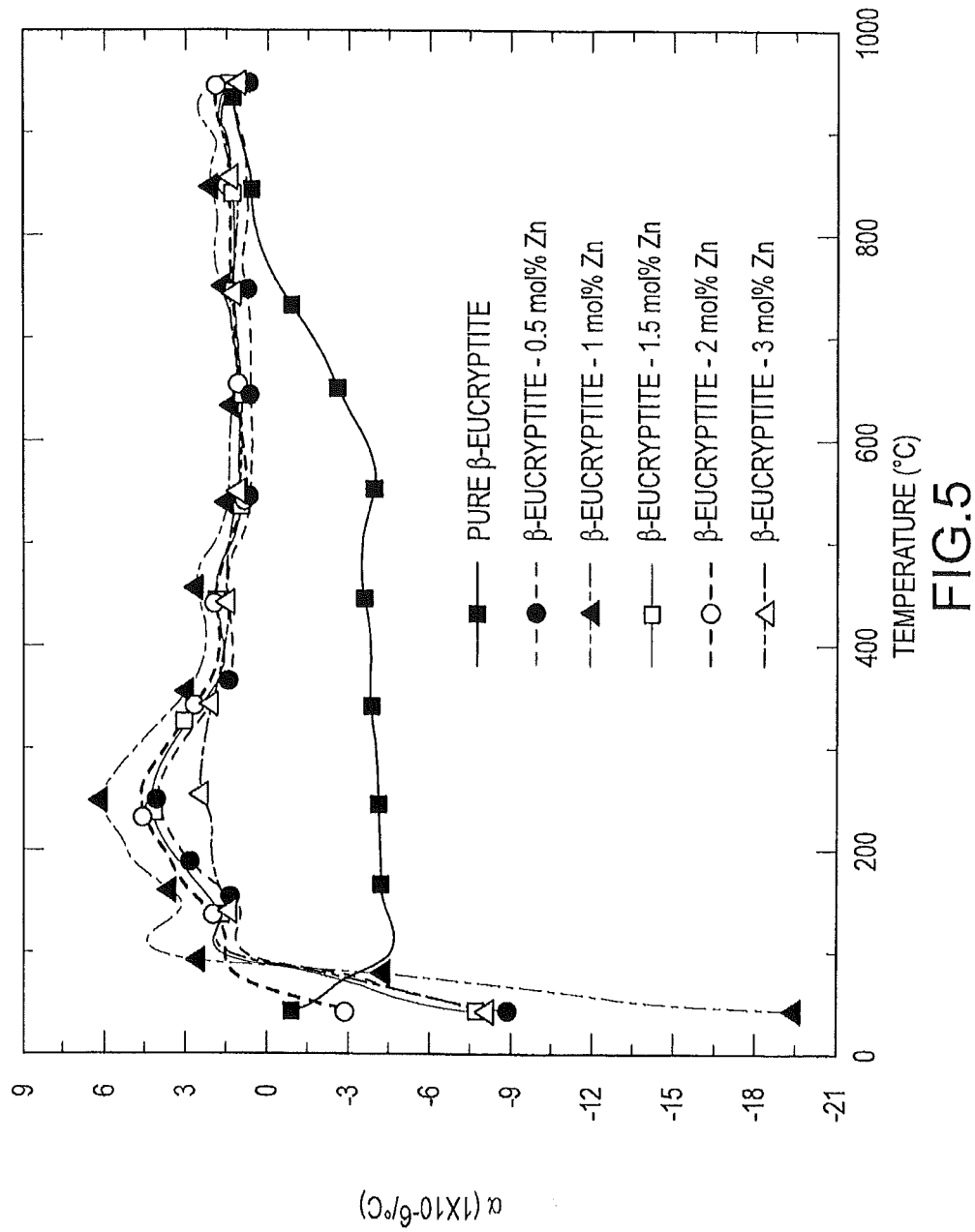
FIG. 5 illustrates the average linear CTE of beta-eucryptite and Zn-doped beta-eucryptite as a function of temperature.

For each sample, the first heating cycle was used to calculate the coefficient of thermal expansion up to about 1000° C. The calculated CTE of beta-eucryptite and Zn-doped beta-eucryptite as a function of temperature is shown in FIG. 5. The Zn doped beta-eucryptite displays a low positive coefficient of thermal expansion (CTE) for a wide temperature range, compared to the negative CTE of pure beta-eucryptite.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for producing a doped low thermal expansion lithia alumina silica material, comprising:
   mixing a source of silica comprising an orthosilicate with an alcohol and a water to produce a first mixture comprising a first volumetric ratio of about 0.5 to about 1.5 parts of the orthosilicate to about 1.0 parts of the alcohol, and a second volumetric ratio of about 0.1 to about 1.0 parts of the water to about 1.0 part of the orthosilicate;
   adjusting the pH of the first mixture to between about 0.5 and about 4.0 by addition of an acid to produce a pH adjusted mixture;
   modifying the pH adjusted mixture by adding a source of alumina comprising an aluminum salt, adding a source of lithia comprising a lithium salt, and adding a metal salt, wherein the metal salt comprises a metal and a counter-ion, to produce a suspension comprising an elemental ratio of about 1 part of aluminum to about 1 part silicon to about 1 part lithium, and a metal concentration in the range of about 0.01 mole % to about 10 mole % of the metal, wherein the metal concentration is relative to the total amounts of the lithium in the suspension; and processing the suspension to produce the doped low thermal expansion lithia alumina silica material.

2. The method of claim 1, wherein the orthosilicate comprises an alkyl orthosilicate.

3. The method of claim 1, wherein the alkyl orthosilicate is selected from the group consisting of tetramethylorthosilicate, tetraethylorthosilicate, tetrapropylorthosilicate, tetrabutylorthosilicate, tetrapentylorthosilicate and mixtures thereof.

4. The method of claim 1, wherein the alkyl orthosilicate is selected from the group consisting of tetramethylorthosilicate, tetraethylorthosilicate and mixtures thereof.

5. The method of claim 1, wherein the alcohol is selected from the group consisting of methanol, ethanol, n-propanol, i-propanol, n-butanol, i-butanol, pentanol and mixtures thereof.

6. The method of claim 1, wherein the water is selected from the group consisting of treated water, untreated water, and mixtures thereof.

7. The method of claim 1, wherein the first volumetric ratio is in the range from about 0.9 to about 1.1 parts of the orthosilicate to about 1.0 parts of the alcohol.

8. The method of claim 1, wherein the second volumetric ratio is in the range from about 0.4 to about 0.6 parts of the water to about 1.0 parts of the orthosilicate.

9. The method of claim 1, wherein the acid is an inorganic acid selected from the group consisting of nitric acid, hydrochloric acid, phosphoric acid, sulfuric acid, boric acid, hydrofluoric acid, hydrobromic acid, and mixtures thereof.

10. The method of claim 1, the aluminum salt comprises a counter-ion selected from the group consisting of sulfates, nitrates, phosphates, carbonates and mixtures thereof.

11. The method of claim 1, the lithium salt comprises a counter-ion selected from the group consisting of sulfates, nitrates, phosphates, carbonates and mixtures thereof.

12. The method of claim 1, wherein the metal is selected from the group consisting of alkali metals, alkaline earth metals, transition metals, post-transition metals, rare earth metals, and mixtures thereof.

13. The method of claim 1, wherein the metal comprises zinc.

14. The method of claim 1, wherein the metal salt is zinc nitrate.

15. The method of claim 1, wherein processing comprises:
   adjusting the suspension with a base to obtain a gel;
   drying the gel to obtain a powder;
   calcining the powder to produce a calcined powder;
   grinding the calcined powder to produce a ground powder; and
   sintering the ground powder to produce the low thermal expansion lithia alumina silica material.

16. A method for producing a zinc doped low thermal expansion lithia alumina silica material, comprising:
   mixing for a time period between about 30 minutes to about 60 minutes a silica source comprising tetraethylorthosilicate with ethanol and distilled water to produce a mixture comprising a first volumetric ratio of about 1.0 parts of the tetraethylorthosilicate to about 1.0 parts of the ethanol, and a second volumetric ratio of about 0.5 parts of the distilled water to about 1.0 parts of the tetraethylorthosilicate;
   adjusting the pH of the mixture to between about 0.5 and about 4.0 by addition of nitric acid to produce a pH adjusted mixture;
   modifying the pH adjusted mixture by adding a source of aluminum comprising aluminum nitrate, adding a source of lithium comprising lithium nitrate, and adding a source of zinc comprising zinc nitrate, to produce a suspension comprising an elemental ratio of about 1 part of aluminum to about 1 part silicon to about 1 part lithium, and a zinc concentration of between about 0.01 mole % to about 10 mole % of zinc, wherein the zinc concentration is relative to the total amounts of the alumina, the lithia, the silica, and the zinc in the suspension;
   forming a gel by adding aqueous ammonia to the suspension;
   drying the gel at a temperature between about 60° C. to about 100° C. for a period of time between about 24 hours to about 48 hours to produce a powder;
   calcining the powder at a temperature between about 900° C. to about 1200° C. for a period of time between about 10 hours to about 36 hours to form a calcined powder;
   grinding the calcined powder to form a ground powder comprising a nominal particle size of about between about 1 µm to about 2 µm; and
   sintering the ground powder at a temperature between about 1100° C. and about 1300° C. for between about 1 hour to about 4 hours, under an applied load of between about 20 MPa to about 40 MPa, in a vacuum hot press to produce the zinc doped low thermal expansion lithia alumina silica material.

17. The method of claim 5, wherein the alcohol is ethanol.

18. The method of claim 1, wherein the doped low thermal expansion lithia alumina silica material is a zinc doped low thermal expansion lithia alumina silica material.

19. The method of claim 12, wherein the metal comprises the alkaline earth metal.

20. The method of claim 12, wherein the metal comprises the transition metal.

* * * * *